Dec. 3, 1929.   J. R. GAMMETER   1,738,472
ABRASIVE WHEEL
Filed June 13, 1928
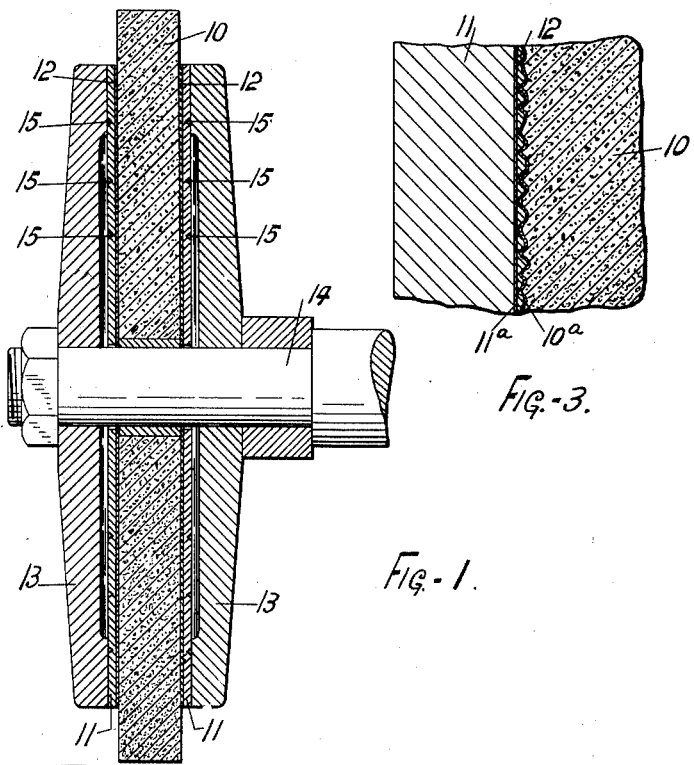
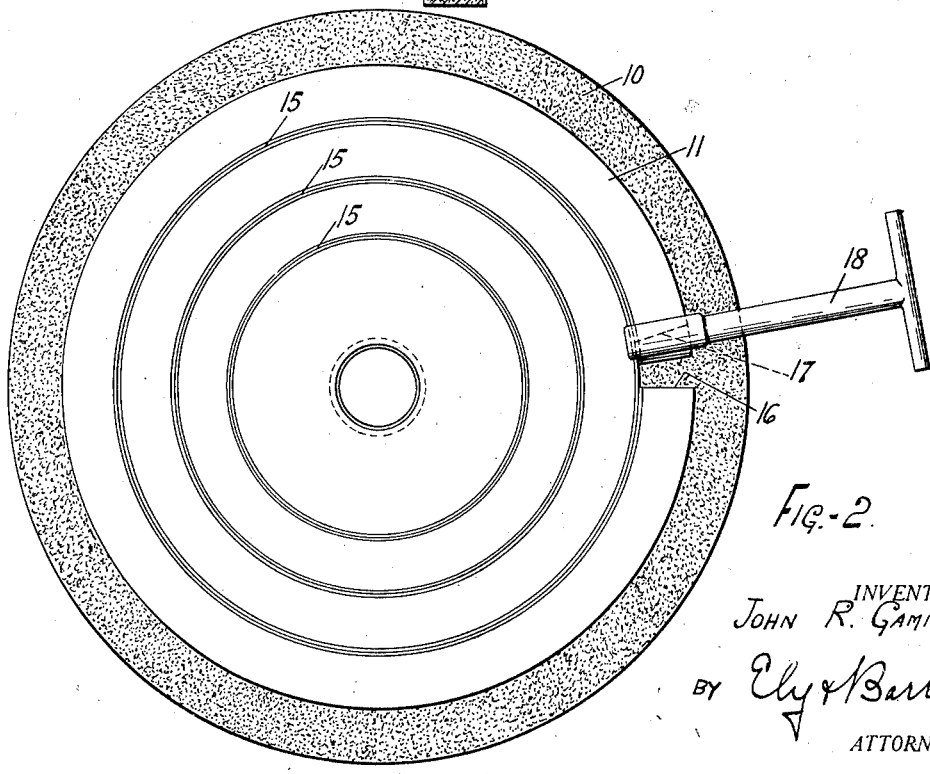
INVENTOR.
JOHN R. GAMMETER.
BY Ely & Barrow
ATTORNEYS.

Patented Dec. 3, 1929

1,738,472

UNITED STATES PATENT OFFICE

JOHN R. GAMMETER, OF AKRON, OHIO, ASSIGNOR TO THE GEORGE W. PERKS COMPANY, OF AKRON, OHIO, A CORPORATION OF OHIO

ABRASIVE WHEEL

Application filed June 13, 1928. Serial No. 285,050.

This invention relates to abrasive wheels such as grindstones, emery wheels, etc. The general purpose of the invention is to provide an improved abrasive wheel of that type having side or face plates secured thereto by intermediate layers of rubber or the like to facilitate clamping of the wheel on a spindle and to so reinforce the wheel as to prevent injury to workmen should the stone break in use. The present invention is directed to the provision of face plates of such construction that as the abrasive wheel wears down, portions of the side or face plates may be removed to permit continued use of the wheel.

Particularly the invention has for its object the provision of face plates scored, preferably in a plurality of concentric circles, so that strips of the plates may be torn off to reduce the diameter thereof as the abrasive wheel wears down.

The foregoing and other objects of the invention are attained in the abrasive wheel shown in the accompanying drawings. It is to be understood that the invention is not limited by the specific disclosure.

Of the accompanying drawings,

Figure 1 is a diametral section through an abrasive wheel embodying the invention shown mounted on a suitable drive shaft;

Figure 2 is an elevation of the wheel illustrating a portion of one face plate being removed; and Figure 3 is a detail illustrating an enlarged sectional view of the wheel.

Referring to the drawings, the numeral 10 designates an abrasive wheel of suitable abrasive material and a binder which has been completed as by firing, heat treatment or other indurating or hardening method and its surface trued and roughened in the customary manner for use in grinding. To apply the face plates preferably of metal indicated at 11, 11, the wheel may be treated, as by spraying on each face, with a suitable material such as liquid rubber derivative or compound of known characteristics indicated at 10$^a$ adapted to secure soft rubber to other harder materials by vulcanization. The side plates 11 are coated with a very thin layer of rubber as indicated at 12 adapted to vulcanize as soft, tough, resilient rubber, this layer being applied to the plates 11 to be secured by vulcanization in any known way as by a layer 11$^a$ of a rubber derivative such as described above, the plates being pickled, plated or otherwise treated for this purpose as will be understood by skilled artisans. The thickness of the layers of rubber preferably should be comparable with the coarseness of the surface of the wheel or with the depth of its interstices or the height of its projections, although this is not absolutely essential since the rubber layer is integrally bonded to the wheel.

Plates 11 are applied to wheel 10 with the rubber coated faces against the treated faces of the wheel and the whole assembly is inserted in a heated press and vulcanized under heat and pressure. The rubber is preferably previously compounded so as to require only a short period of vulcanization at this time to secure a permanent union of rubber to the stone. The completed wheel is then cooled while maintained under pressure. The vulcanization period may be about twenty minutes and is carried out after completion of the wheel hardening process because the high temperatures incident to hardening the wheel would destroy the rubber.

The pressure employed during vulcanization should be sufficient to cause the rubber to flow and fill the interstices in the faces of the wheel with the projections on the faces preferably embedded substantially into contact with the metal face plates 11. This provides a normally inseparable union of plate 11 to the wheel 10 which, in addition to resisting breakage of the wheel, due to expansion and contraction, absolutely prevents flying out of a broken sector.

The wheel is mounted for use as shown in Figure 1 clamping plates 13, 13 being shown to clamp the wheel on spindle 14. the rubber layer 12 absorbing the clamping action of the clamping plates 13, 13 tending to prevent breakage of the stone in clamping it upon a spindle 14 and also absorbing strains incident to differential expansion and contraction of the wheel caused by heat localized at its periphery when grinding. Since the rubber is forced into interstices of the wheel during vulcanization, the clamping plates need not be clamped under high pressure against the wheel as is required when separate rubber faced washers are used in accordance with a prior practice, just sufficient clamping action being required as is necessary for driving the wheel.

As the abrasive wheel wears in use, it would become useless after wearing to the edges of plates 11. Accordingly, these plates are formed with scorings at 15, 15, preferably a series of concentric circles, which extend to sufficient depth therein that the strips of the plate between the scorings can be torn from the plates to reduce the diameters of the plates. This may be accomplished by cutting the strip transversely as with a chisel as indicated at 16 and turning up a portion of the strip as illustrated at 17, whereby a slotted key 18 may be engaged therewith, the strip being torn from the plate by actuation of the key about the plate, the torn strip wrapping onto the key as will be understood.

After the diameter of the plates have been thus reduced, clamping plates, such as 13, of lesser diameter are used to remount the wheel on shaft or spindle 14. Of course, any suitable number and spacings of scorings may be utilized, depending upon the dimensions and character of the wheels. The scorings, of course, need not be circular or concentric, other forms readily suggesting themselves for securing the advantages to be derived from the invention. Accordingly, numerous modifications of the invention may be resorted to without departing from the spirit thereof or the scope of the appended claims.

What is claimed is:—

1. An abrasive wheel having face plates on the opposite faces thereof, each of said face plates being integrally secured to said wheel by intermediate layers including a layer of soft rubber and layers of rubber material by which the soft rubber layer is permanently vulcanized to the plate and to said wheel, said layers being of a total thickness comparable with the coarseness of the stone and filling the interstices in the faces thereof, said face plates being scored so that one or more strips can be torn therefrom to reduce the diameters thereof as the wheel wears.

2. An abrasive wheel having face plates on the opposite faces thereof, each of said face plates being integrally secured to said stone by intermediate layers including a layer of soft rubber and layers of rubber material by which the soft rubber layer is permanently vulcanized to the plate and to said wheel, said face plates being scored so that one or more strips can be torn therefrom to reduce the diameters thereof as the wheel wears.

3. An abrasive wheel having face plates on the opposite faces thereof, each of said face plates being secured to said wheel by an intermediate layer of tough, resilient rubber permanently vulcanized to each plate and to the wheel, each face plate being scored so that one or more strips can be torn therefrom to reduce the diameter thereof as the wheel wears.

4. An abrasive wheel having an integral face plate secured thereon by a layer of tough, resilient material permanently bonded to the plate and the wheel, said face plate being scored so that one or more strips can be torn therefrom to reduce the diameters thereof as the wheel wears.

5. An abrasive wheel having face plates integrally secured thereto, said plates being formed to tear along one or more lines defining one or more strips, whereby the diameters thereof can be reduced by tearing said strips from the plates as the wheel wears.

6. An abrasive wheel having one or more reinforcing members bonded by a rubber-like material cured on one or both faces of said wheel so as to be substantially integral therewith for normal use of the wheel, said members being constructed with one or more strips of such form and said material being of such character that said strips are adapted to be torn from the faces of the wheel so that said members are reduceable in diameter as the wheel wears.

JOHN R. GAMMETER.